US 7,013,485 B2

(12) United States Patent
Brown et al.

(10) Patent No.: US 7,013,485 B2
(45) Date of Patent: Mar. 14, 2006

(54) COMPUTER SECURITY SYSTEM

(75) Inventors: Daniel Brown, Austin, TX (US);
Fernando Zapata, Austin, TX (US)

(73) Assignee: i2 Technologies U.S., Inc., Dallas, TX (US)

(*) Notice: Subject to any disclaimer, the term of this patent is extended or adjusted under 35 U.S.C. 154(b) by 830 days.

(21) Appl. No.: 09/800,168

(22) Filed: Mar. 5, 2001

(65) Prior Publication Data

US 2001/0047485 A1    Nov. 29, 2001

Related U.S. Application Data

(60) Provisional application No. 60/187,375, filed on Mar. 6, 2000.

(51) Int. Cl.
*G06F 17/00* (2006.01)
(52) U.S. Cl. ............................. 726/27; 726/28; 726/30
(58) Field of Classification Search ........ 713/200–202, 713/166; 707/9, 8; 726/1–36
See application file for complete search history.

(56) References Cited

U.S. PATENT DOCUMENTS

| 5,315,657 A |   | 5/1994  | Abadi et al. ............. 380/25 |
| 5,677,851 A | * | 10/1997 | Kingdon et al. .......... 709/229 |
| 5,748,890 A |   | 5/1998  | Goldberg et al. ...... 395/188.01 |
| 5,889,952 A | * | 3/1999  | Hunnicutt et al. ........ 709/219 |
| 5,956,715 A | * | 9/1999  | Glasser et al. ............. 707/9 |

OTHER PUBLICATIONS

"Purveyor Administrator's Guide", Sep. 8, 1997, [Retrieved from Internet Aug. 10, 2004], "http://www.stosc.stsci.edu/~help/helpaccess.html".*
"HomeDoor 2.0 User's Guide", 1999, [Retrieved from Internet Mar. 8, 2004], http://www.opendoor.com/homedoor/UG/HomeDoorIntro.html.*
http://www.webdav.org/acl/teleconf/teleconf-000505.txt.*
http://en.wikipedia.org/wiki/Access_control_list.*
http://www.dlib.org/dlib/june97/ibm/06gladney.html.*
PCT Written Opinion, 7 pages, Dec. 21, 2001.
R. Sant'Angelo, "Windows NT 4® Administrator's Survival Guide," Copyright © 1997 by Sams Publishing, Index, Table of Contents (3 pages), pps. 130, 191, 193-209, 213-218, 253-260, 279-281, 407, 417-418, 422, 503, 528-532, http://emedia48.netlibrary.com/api-bin/...234.
nfo&record={1625}&softpage=Document, May 17, 2001.

(Continued)

*Primary Examiner*—David Jung
(74) *Attorney, Agent, or Firm*—Brian E. Harris; James E. Walton

(57) ABSTRACT

A security system for a computer system provides one or more security domains. Access to assets registered to the security system is controlled by rights and privileges. Rights are derived from roles, and each user is assigned one or more roles. Privileges are attached to assets, and an appropriate combination of rights and privileges is required before a user is granted the specified type of access to the asset.

46 Claims, 5 Drawing Sheets

OTHER PUBLICATIONS

G.W. Kadnier, "Windows NT 4: The Complete Reference," Osborne/McGraw-Hill © 1997, Table of Contents, Chapter 16: NT 4 Security, 5 pgs., NT 4 Security, Bare to the Bone 7 pgs., NT 4 Security, The NT Miranda—"You Have the Right To . . . ," 1 pg., NT 4 Security, NT C2-Level Security, 1 pg., NT 4 Security, Controlling Security and Users: The NT User Manager, pps. 1-6, 8 http://library.books2x7.com/toc.asp?bkid, May 18, 2001.

B. Sosinsky, "Windows NT 4 Answers! Certified Tech Support," Osborne/McGraw-Hill © 1998, Synopsis and Table of Contents, Back Cover, NT 4 Answers! Certified Tech Support, Working With The Security Modelo @ a Glance, 1 pg., NT 4 Answers! Certified Tech Support, The Security Database, 1 pg., NT 4 Answers! Certified Tech Support, Users, Groups, and Domains, 6 pgs., NT 4 Answers! Certified Tech Support User Profiles, 4 pgs., System Policies, pp. 1, 1-4 http://library.books2x7.com.toc.asp?bkid=406, May 17, 2001.

International Searching Authority, Notification of the Transmittal of The International Search Report, 7 pgs., Jun. 18, 2001.

* cited by examiner

Parent-Child

Peer-to-Peer

FIG 8
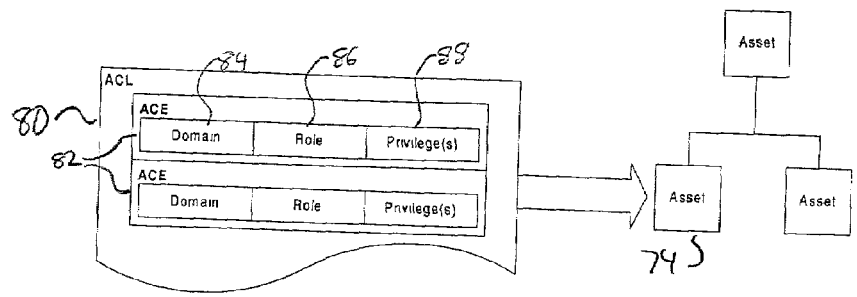
FIG 9
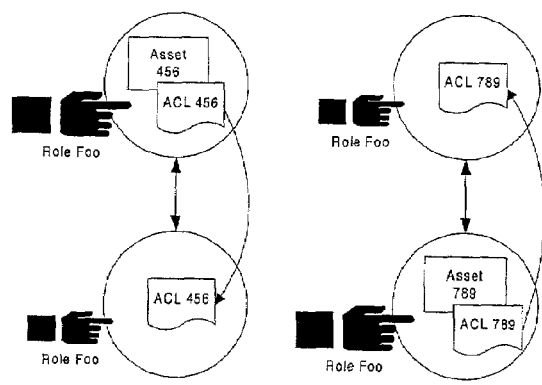
FIG 10

COMPUTER SECURITY SYSTEM

CROSS REFERENCE TO RELATED APPLICATONS

The present application claims the benefit of U.S. Provisional application No. 60/187,375, filed on Mar. 6, 2000.

BACKGROUND OF THE INVENTION

1. Field of the Invention

The present invention relates generally to computer systems, and more specifically to security systems and methods for controlling and authorizing access to computer systems.

2. Description of the Prior Art

Security is an important consideration for computer systems that grant access to multiple users. This is especially true when access can be obtained from outside a physically restricted area, such as systems generally available over the internet. As systems become more complex, and access to data needs to be more widely distributed, security systems tend to become more complex.

Such issues arise in the context of different businesses sharing data and processes over distributed computer systems. It becomes important that security can be administered from more than one location, by more than one administrator. Further, due to different companies doing business in different ways, security systems intended for use by different business must be flexible, and able to accommodate different security implementations.

Present security systems are often cumbersome, and do not have the desired flexibility. It would be desirable to provide a computer security system that was flexible, extendable, and allowed multiple administrators to operate concurrently to provide needed security. It would be desirable that such a system allows administrators to define additional types of security, and supply security for additional types of objects, than are originally provided for.

SUMMARY OF THE INVENTION

In accordance with the present invention, a security system for a computer system provides one or more security domains. Access to assets registered to the security system is controlled by rights and privileges. Rights are derived from roles, and each user is assigned one or more roles. Privileges are attached to assets, and an appropriate combination of rights and privileges is required before a user is granted the specified type of access to the asset.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 8 and 9 illustrate preferred use of access control lists in accordance with the preferred embodiment;

FIG. 10 is a diagram showing the use of bi-directional transfer of privileges.

DESCRIPTION OF THE PREFERRED EMBODIMENT

It will be understood by those skilled in the art that the following description can easily be implemented on numerous different underlying systems. The described system describes a particular set of techniques and methods for granting users access to various files, executables, and other system assets available on the system being protected. The described security system and method does not necessarily provide complete system security, but can be supplemented by other products widely available in order to provide complete security. As will be appreciated by those of ordinary skill, the description below indicates where and how it is to be implemented on any desired system.

Figure 1:
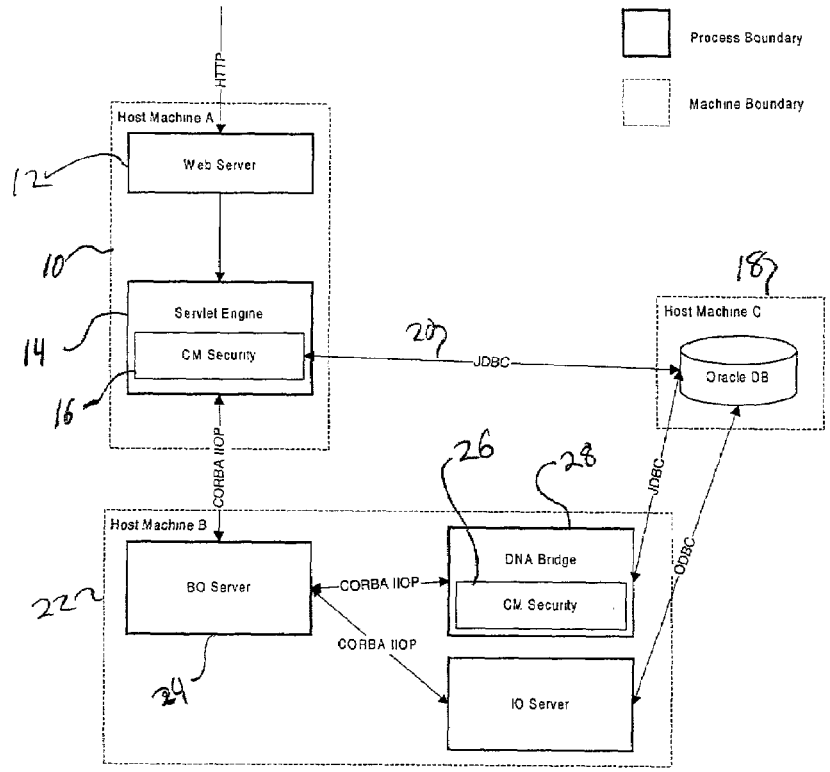
FIG. 1 is a block diagram of a system for providing security to a computer system.

FIG. 1 is a block diagram of a security system implemented in accordance with a preferred embodiment of the invention. FIG. 1 shows the architecture of the preferred system, with particular focus on the security service. A first host machine 10 includes a web server application 12 and a servlet engine 14. Application logic 16 that resides in the servlet engine 14 makes in-process calls to the security API where applicable. The security service communicates with a database 18, which can be an Oracle database, via JDBC link 20.

A second host machine 22 contains the application 24 functionality to which access is desired. The application 24 in turn relies on the security service 26 for access control information. In one embodiment, the BO Server 24 is a C++ engine, and communicates with Security 26 using a CORBA server called the 'DNA Bridge 28. The DNA Bridge 28 is responsible for sending raw permissibility data to the BO Server 24, which then handles the actual enforcement.

Figure 2:
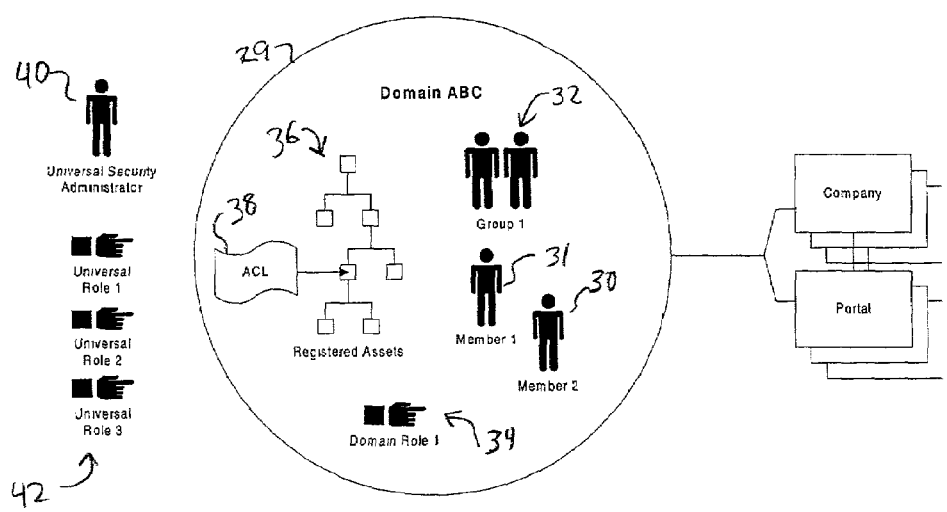
FIG. 2 is a diagram illustrating the structure of a computer security system in accordance with the present invention.

The described security model is centered on the concept of a domain 29, shown in FIG. 2. A domain is an administrative and access control boundary around a collection of security entities. These entities consist of:

1. members 30, 31, which are users who have authenticated themselves to the domain;
2. groups 32, which are collections of members used to facilitate administration;
3. roles 34, which represent the responsibilities that members may assume;
4. registered assets 36, which are resources that the system is responsible for protecting;
5. ACLs (Access Control Lists) 38, which define the privileges that roles should have when accessing assets.

Domains are used to provide a security "sandbox" for members. The "sandbox" controls what members may do to which assets during a given session with the system. The system has many domains, some or all of which may be in use at any given time. A domain can be mapped to any entity external to Security, but many applications have only found the need to map a domain to a business/company.

Most entities reside within a single domain for the duration of a session, but there exist some special entities that have visibility across multiple domains. One of these, the universal security administrator 40 (also called the "super user"), is a special member who is allowed to administer the entire security model, including all of the entities within any domain. Another special entity is the role. Security uses roles to implement declarative and programmatic security. There are two kinds of roles in the system:

1. domain roles 34, which are visible only within a single domain; and
2. universal roles 42, which are visible across all domains.

Universal roles 42 represent user responsibilities that are commonly accepted and understood by several collaborating domains. They exist so that the workflow of a shared application is consistent for—and understandable by—all of its users. Domain roles 34 have meaning only within the domain in which they are defined.

The domain to which a user authenticates himself at the beginning of a session dictates the roles that he may utilize. The following example illustrates:

1. Let domains be "Acme Computers" and "Beta Bank"
2. Let member be "jsmith"
3. Let universal roles be "Administrator" and "Purchaser"
4. Let domain role for Beta Bank be "Teller"
5. Let domain role for Acme Computers be "Assembler"
6. Let jsmith be assigned to both domains
7. Let jsmith be assigned to roles Administrator, Purchaser, and Teller If jsmith logs into the Acme Computers domain, his active role set consists of:
Administrator, Purchaser If jsmith logs into the Beta Bank domain, his active role set consists of:
Administrator, Purchaser, Teller The member jsmith does not have the Assembler role when he logs into the Acme Computers domain because he has not been granted that role.

Figure 3:
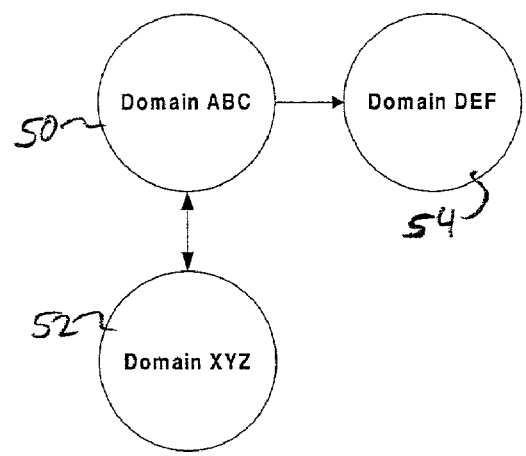
FIGS. 3 and 4 are diagrams illustrating domain relationships in accordance with a preferred embodiment.

Two domains may be joined by a trust relationship. A trust relationship determines how privileges may be delegated from one domain to another. Trust may be unidirectional or bi-directional, as shown in FIG. 3. For example, Domain ABC 50 has a unidirectional trust relationship with Domain DEF 54 (ABC trusts DEF), which implies that privileges on ABC's assets may be delegated from ABC to DEF. ABC 50 has a bi-directional trust relationship with XYZ 52, which implies that privileges on ABC's assets may flow to XYZ, and vice-versa.

Figure 4A:
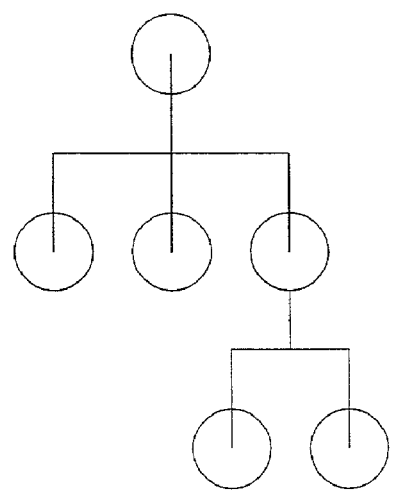
Figure 4B:
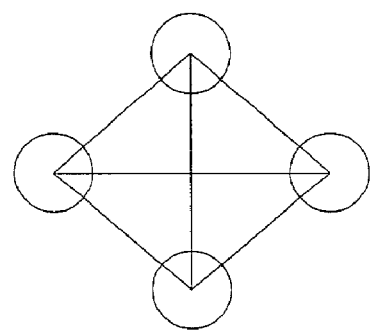

A domain may also own another domain, i.e. be responsible for its creation and destruction. As shown in FIG. 4, a parent-child topology is used to represent domain ownership and a peer-to-peer topology is used when there is a lack of ownership between domains.

The trust and ownership concepts may be combined. For example, a group of domains may be connected together in a parent-child topology, where each connection is also a unidirectional trust. This implies that privileges may be delegated from the top-most domain down to the lower-level domains. It also implies that each domain has created the domain(s) beneath it.

The model described in the previous paragraph can be illustated by an example. Assume a customer uses this model for its catalogs and categories. The customer creates subsidiary domains and then gives each subsidiary access to a subset of its catalogs and categories. The subsidiaries in turn create distributor domains and then give the distributors access to a further subset of the catalogs and categories. Support for additional domain relationship and topologies will be added as the need arises.

Figure 5:
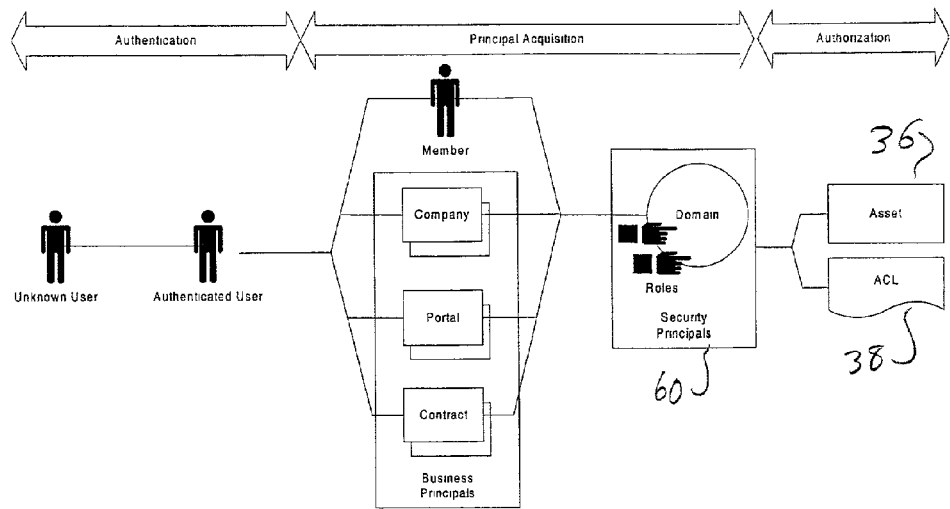
FIG. 5 is a diagram illustrating preferred steps in granting access and authorization to a user.

The "security principals" that are associated with a user—consisting of domains and roles—determine what the user has access to. As shown in FIG. 5, security principals are acquired after a user is authenticated. Authentication establishes the user's identity, which can then be used to obtain relevant information about the user's involvement in the business domain (such as what company he is employed with and what portal he has logged into). These "business principals" are subsequently used to derive the security principals that should be in effect for the member. The system uses these security principals to make authorization decisions.

Figure 6:
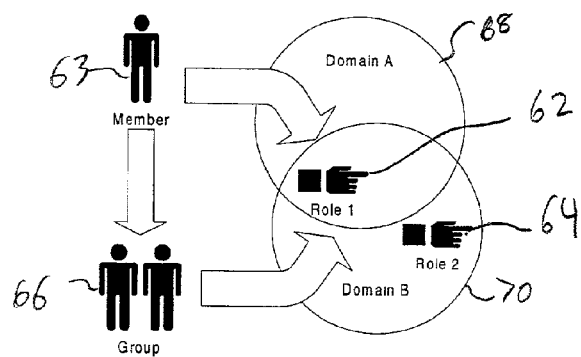
FIG. 6 is a diagram illustrating the use of roles within a preferred security system.

As indicated in FIG. 6, roles 62 may be granted directly to a member 63, or they may be granted 64 to a group 66. Any member who is assigned to the group will in turn receive the privileges enjoyed by the group roles 64. The relationship between members and roles is determined dynamically at login time. A member 63 may be assigned to multiple roles, but only a subset of them may be usable within a given domain. For example, the member 63 in FIG. 6 has been granted Role 1 62 and Role 2 64, but Domain A 68 only allows him to use Role 1 62, whereas Domain B 70 allows him to use both Roles 1 and 2. Whether or not a role is usable in a domain depends on the type of role (i.e. universal role or domain role).

Figure 7:
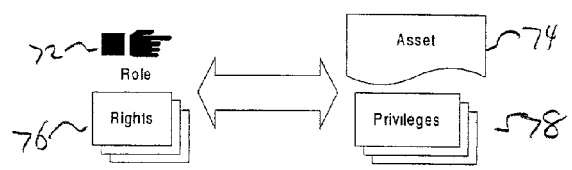
FIG. 7 is a diagram showing the relationships between rights and privileges in a preferred embodiment.

As shown in FIG. 7, the roles that a member has been granted ultimately determine what assets 74 the member can access. Access control decisions are made by combining rights with privileges:

1. rights 76 are attached to roles 72 and override privileges on assets. For example, the universal security administrator (super user) 40 has special rights which enable him to administer any asset in the system regardless of the privileges that have been specified on the asset. The universal security administrator is an example of a right that is defined by the Security system, but rights may also be defined by an application. Applications that control workflow based upon a particular role are implicitly attaching rights to that role.
2. privileges 78 are attached to assets 74 and are used to grant fine-grained access to an asset A single privilege identifies what operation may be performed by what role on which asset. The mechansim for attaching privileges to assets 74 is the access control list (ACL) 80. An ACL 80 contains a series of access control entries (ACEs) 82, each of which contains a domain identifier 84, a role identifier 86, and one or more privileges 88, as shown in FIG. 8. The domain identifier 84 and role identifier 86 are the security principals that may be associated with one or more members. An ACE 82 contains both because a privilege for a role must be scoped by the domain (e.g. an Admin may be able to perform some operation in one domain, but may be prevented from doing so in a different domain).

A privilege allows the domain/role combination to perform an operation on the asset. As shown in FIG. 9, the basic operations consist of read and write. Other operations may be available, but these are dependent upon the type of asset being administered.

In addition to privileges, a domain/role may be granted ownership over a particular operation on the ACL. An owner of an ACL is allowed to modify it within certain limits:

1. if a domain/role owns an operation on an ACL, a member who possesses that domain/role principal combination may grant the operation to the same role within a different domain.

For example, in FIG. 9, a member who is in Domain ABC and has Role Foo owns the write operation on the ACL. This member effectively becomes an administrator of the ACL and is therefore allowed to grant the write operation to Role Foo in Domain DEF. He is also allowed to grant Domain DEF/Role Foo ownership of the write operation.

ACL ownership and administration are the mechanisms by which privileges are transferred between domains. In a unidirectional transfer of privileges, the capabilities of a role tend to diminish the further you move away from the "home" domain (i.e. where the asset is created). This is because an administrator may never pass on more privileges than he himself has. At most, the role capabilities would remain constant across all of the domains, but in practice this would not be likely.

In a bi-directional transfer of privileges, as shown in FIG. 10, the capabilities of a role would vary across domains according to the asset in question.

A registered asset is a resource that the security system is responsible for protecting. Registered assets are classified according to their asset type, which determines how assets should be identified and what operations may be performed on them. One possible list of basic asset types includes price group, price template, catalog, category, product group, and URL. This list would be of use in deploying an ordering system, or similar enterprise. New asset types may be defined at deployment time, as described below.

An asset type defines both meta-level and instance-level operations. Meta-level operations are those that are performed without an instance, for example the create operation can be invoked for a Price Template, but it does not apply to an instance because the instance does not yet exist. Instance-level operations, such as read, write, and delete, are those that are performed on an explicit instance, such as deleting a Price Template, which requires a specific instance to delete.

Individual assets are identified via a name known as a moniker. Monikers are alphanumeric strings that conform to a predetermined format as defined by the asset type. Monikers may be hierarchical in nature, and they may be defined in terms of regular expressions. For example, an asset of type URL may have the following as a moniker:

/RhythmAuthor/Content/Pricing/CategoryList.jsp

The parent asset would be as follows:

/RhythmAuthor/Content/Pricing

Figure 11:
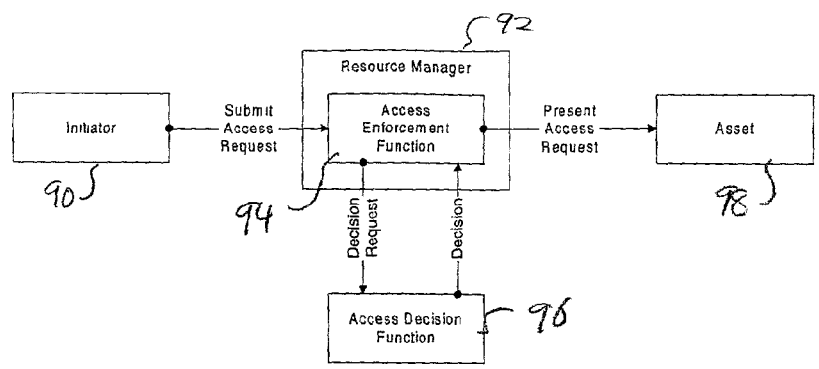
FIGS. 11 and 12 are block diagrams illustrating preferred user authorization methods.

The preferred system supports two modes of authorization: decision-based and entitlement-based. The main difference between the two modes is the information that is returned by the security system. In decision-based mode, illustrated in FIG. 11, a simple yes/no answer is returned to the client. Decision-based authorization is defined by the following sequence:

1. An initiator 90 sends a request to a resource manager 92. The request consists of an asset, an operation to perform on that asset, and the initiator's principals (role and domain).
2. The request is intercepted by an access enforcement function 94 that lives inside of the resource manager 92.
3. The access enforcement function 94 forwards the request information to the access decision function 96.
4. The access decision function 96 renders a yes/no judgment on the request and returns this decision to the access enforcement function 94.
5. The access enforcement function 94 takes appropriate action (for example, allow request to proceed, redirect, send error message, etc.) based upon the recommendation provided. Access is allowed to the asset 98 only if the initiator's principals allow it.

Figure 12:
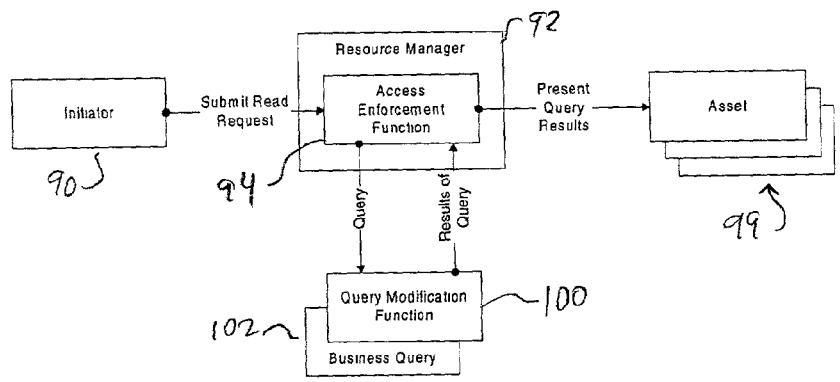

In entitlement-based mode, illistrated in FIG. 12, a collection of objects 99 is returned to the client. Entitlement-based authorization is defined by the following sequence:

1. An initiator 90 sends a read request to a resource manager 92. The request consists of query criteria (e.g. all computer peripheral-related categories) and the initiator's principals.
2. The request is intercepted by an access enforcement function 94 that lives inside of the resource manager 92.
3. The access enforcement function 94 forwards the request information to the query modification function 100.
4. The query modification function 100 adds security-related criteria to the request and executes a business query 102.
5. The results of the query are returned to the access enforcement function 94.
6. The access enforcement function 94 takes appropriate action (e.g. returns query results to the initiator, redirects, etc.)

The objects that are returned conform to the initiator's application-specific criteria as well as some security-specific criteria. The query results contain only the objects that the intiator has read access to, which may be a subset of those requested.

A preferred embodiment allows implementers to define new asset types. The steps for defining a new asset type are as follows:

1. Create a new row in the SEC_ASSET_TYPE table. Supply values for columns NAME, DESCRIPTION, and FORMAT. The latter must be a valid regular expression that defines a unique moniker format (i.e. naming format for the string used to identify the asset). The uniqueness requirement exists because when a request is made for an asset, the moniker is supplied as an argument. In order for security to match the asset with its correct type, the moniker argument is compared against each naming format. The asset type is discovered as soon as an exact match is made. For example, the moniker "BLM:CM.Catalog.Catalog: [2FA4A958AA8311D4985A00508BD626C1]" cannot be mistaken as a moniker for a URL asset type because it will not match the URL format "(/[A–Za–z0–9/._]+) ([?]{0,1}.*)".
2. Determine what operations should apply to the new asset type. If these operations do not already exist in the SEC_OPERATION table, go ahead and add them. Supply values for columns NAME, DESCRIPTION, and META_FLAG. The value for the latter column should be "false" if the operation is instance-level, and "true" if it is meta-level.
3. Associate the operations with the new asset type by adding entries to the SEC_ASSET_OPERATION table. This table is merely a link table to facilitate many-to-many relationships between asset types and operations.

The above description sets forth the mechanism and steps of the preferred security system. Although the terms used are relatively self-explanatory, the following list will assist those skilled in the art in understanding the description:

Access Decision Function (ADF): A process that renders an authorization decision (yes/no). An ADF is internal to the security system.

Access Enforcement Function (AEF): A process that reacts to an authorization decision. An AEF typically controls workflow and may be internal or external to the security system.

Access Entitlement Function: A process that performs queries and limits the results to only those objects that an initiator has read access to.

Active Principal Set (APS): A grouping of principals for a particular member. The APS is determined dynamically after a user is authenticated.

Anonymous User: A user whose identity has not been verified by the system. An anonymous user is considered untrustworthy.

Asset: A resource that is eligible for protection by the Security system. It is an actual physical file, application, object, or set of data.

Asset Type: A category of resources having similar security characteristics. An Asset Type is associated with one or more operations, and an operation is associated with one or more asset types.

Authentication: The process of determining the identity of a user. Authentication ensures that users are who they claim to be, but says nothing about their rights to perform an operation on a registered asset.

Authenticated User: A user whose identity has been verified by the system.

Authorization: The process of determining whether a user has the right to perform an operation on a registered (protected) asset. Authorization may occur in two modes:
1. decision mode, in which an initiator makes a request to perform an operation on an asset and a yes/no response is furnished, or
2. entitlement mode, in which an initiator makes a request to perform the read operation on a set of assets, and a filtered subset of the assets is furnished. The filtered subset contains only those assets that the initiator is allowed to read.

Credential: An item that a user supplies to the system to prove his/her identity. A credential can consist of something the user knows (e.g. password) or has (e.g. digital certificate).

Group: A named collection of members who have similar characteristics.

Initiator: A client that makes a request of the security system. An initiator may be a user or an application.

Member: An account that is associated with an authenticated user. A member is associated with exactly one Person (from Profile Management), and a Person is associated with zero or one member.

Operation: An action or procedure that may be performed upon an asset. An operation is specific to an asset type.

Policy: A set of rules that describe the ability of various users to access the resources within an application. A policy defines the principals that have the right to perform certain operations upon one or more assets.

Principal: A name or identifier that the system uses to make authorization decisions. A principal is a necessary component of a policy. A principal may be associated with zero or more members, and a member may be associated with zero or more principals. The association between a principal and a member is determined dynamically.

Principal Acquisition: The process by which one or more principals are bound to a member to form the Active Principal Set. Principal acquisition occurs after authentication.

Principal Type: A category of principals having similar characteristics. Each principal among those of the same type must be unique. The principal types are: role, company, portal.

Registered Asset: A logical representation of an actual system resource that is under the protection of the Security system.

Authorization Request: An inquiry that an initiator makes of the security system, consisting of an asset, an operation, and an active principal set.

Role: An abstract representation of a user's function or ability.

User: A person or entity that interacts with the application.

User Registration: A process by which a user supplies information about himself and thereby becomes eligible for greater access to the resources within an application. The product of the user registration process is a person and a member (account).

The described system allows for easy group administration of the overall security system. Because of transfer of privileges, various levels of administration can be passed down the line. For example, a single super user can designate other administrators having various degrees of administrative authority, so that various administrative functions can be distributed among numerous administrators. Each administrator can delegate all or a portion of her administrative rights as desired.

Also, because bi-directional transfer of privileges is allowed, same-level administrators at different companies can cooperate to effectively administer a combined system. This allows administrators to grant privileges for those domains, or portions of a domain, that they are responsible for or familiar with. In this manner, it is not necessary that a single super user is tasked with all final security responsibility.

Because a customer can define additional resource types, and additional types of security to be applied to them, the system is more flexible than most available security systems. When combined with the ability for separate domains to be treated together, with individual security within a domain, a truly generic and flexible security system is provided.

While the invention has been particularly shown and described with reference to a preferred embodiment, it will be understood by those skilled in the art that various changes in form and detail may be made therein without departing from the spirit and scope of the invention.

What is claimed is:

1. A security system for a computer system, comprising:
a plurality of assets within the computer system;
a plurality of members registered to use the computer system;
a plurality of groups, each group comprising at least two of the plurality of members;
a plurality of roles defining user rights to access one or more of the plurality of assets, each member and each group associated with at least one role;
a plurality of access control lists each corresponding to an asset and defining at least one privilege for accessing the asset corresponding to the privilege, according to a member's role; and
at least one domain being an administrative and access control boundary around a plurality of security entities, the security entities of the at least one domain comprising:
a subset of the plurality of assets and the access control lists corresponding to the assets in the subset of the assets;

a subset of the plurality of roles; and
a subset of the members;

each privilege defined in the access control lists of the at least one domain identifying one or more roles in the domain that may access the asset corresponding to the privilege;

the security system operable to authorize a particular member to perform a requested operation with respect to a requested asset within the domain when the particular member is associated with a role, in the domain, corresponding to a privilege for the requested asset.

2. The system of claim 1, wherein:

the privileges for each asset include operations that can be performed on that asset; and the security system is operable to authorize access to the requested asset when a requested access by the particular member includes an operation to be performed from the access control list and the particular member is associated with a role, in the domain, corresponding to a privilege for the requested asset.

3. The system of claim 1, wherein the at least one privilege includes one or more of:
   a read privilege;
   a modify privilege; and
   a delete privilege.

4. The system of claim 1, wherein the system includes at least two domains.

5. The system of claim 4, wherein the plurality of roles comprise one or more of:
   a domain role defining user rights within a single domain; and
   a universal role defining user rights across a plurality of domains.

6. The system of claim 4, wherein a first domain and a second domain are joined by a unidirectional trust relationship, allowing privileges associated with the first domain's assets to be delegated to the second domain.

7. The system of claim 4, wherein a first domain and a second domain are joined by a bidirectional trust relationship, allowing:
   privileges associated with the first domain's assets to be delegated to the second domain; and
   privileges associated with the second domain's assets to be delegated to the first domain.

8. The system of claim 4, wherein a first domain owns a second domain such that the first domain can create and destroy the second domain.

9. The system of claim 1, wherein the plurality of roles are assigned to a plurality of user groups, each user group comprising one or more of the plurality of members.

10. The system of claim 1, wherein each of the plurality of access control lists comprises a plurality of access control entries, each comprising:
    a domain identifier;
    a role identifier; and
    one or more privileges.

11. The system of claim 1, wherein:
    the system comprises at least two domains; and
    the system is further operable to grant the particular member, which is assigned a particular domain/role combination, ownership of a particular operation on a particular access control list, ownership over of the particular access control list allowing the particular member to grant rights to perform the operation to one or more members in a different domain than the particular member that are assigned the same role as the particular member.

12. The system of claim 1, wherein:
    one or more of the plurality of assets each comprise a registered asset, a registered asset being a resource that is protected by the security system; and
    each registered asset is classified according to a corresponding asset type, which determines how its corresponding registered assets are identified and what operations may be performed on its corresponding registered assets.

13. The system of claim 1, wherein the security system is operable to authorize access to the requested asset by:
    receiving from the particular member a request to access the requested asset, the request comprising:
      an identification of the requested asset;
      an identification of an operation to perform with respect to the requested asset; and
      an identification of the domain and role assigned to the particular member;
    determining, based at least in part on the access control list corresponding to the requested asset and the domain and role assigned to the particular member, whether the particular member may perform the identified operation with respect to the requested asset; and
    initiating an appropriate action based on the authorization determination.

14. The system of claim 1, wherein the security system is operable to:
    receive from the particular member a request comprising:
      one or more query criteria specifying one or more assets; and
      an identification of the domain and role assigned to the particular member;
    add appropriate security-related criteria to the request;
    execute a query to determine one or more assets satisfying the query criteria to
    which the particular member has read access; and
    initiate an appropriate action based on results of the executed query.

15. The system of claim 1, further operable to:
    receive a request to define a new asset type, the request comprising one or more of a name of the new asset type, a description of the new asset type; and a format of the new asset type;
    enable determination of one or more operations that should apply to the new asset type; and
    enable association of the determined one or more operations with the new asset type.

16. The system of claim 1, further operable to, prior to the particular member attempting to access the requested asset:
    authenticate the particular member's identification; and
    assign at least one role to the particular member.

17. A method for providing secure access to a plurality of assets within a computer system, comprising:
    registering a plurality of members to use the computer system;
    establishing a plurality of groups, each group comprising at least two of the plurality of members;
    providing a plurality of roles defining user rights to access one or more of the plurality of assets, each member and each group associated with at least one role;
    providing a plurality of access control lists each corresponding to an asset and defining at least one privilege for accessing the asset corresponding to the privilege, according to a member's role;

providing at least one domain defining an administrative and access control boundary around a plurality of security entities, the security entities of the at least one domain comprising:
  a subset of the plurality of assets and the access control lists corresponding to the assets in the subset of the assets;
  a subset of the plurality of roles; and
  a subset of the members;
each privilege defined in the access control lists of the at least one domain identifying one or more roles in the domain that may access the asset corresponding to the privilege;
when a particular member attempts to access a requested asset within the at least one domain, determining at least one role assigned to the particular member;
comparing rights corresponding to the role assigned to the particular member to the privileges defined in the access control list corresponding to the particular asset; and
if the attempted access is authorized for the role assigned to the particular member, allowing the particular member to access the requested asset.

18. The method of claim 17, wherein a requested access is one from the types read, modify, or delete.

19. The method of claim 17, further comprising, prior to the particular member attempting to access the requested asset:
  authenticating the particular member's identification; and
  assigning at least one role to the particular member.

20. The method of claim 17, further comprising providing at least two domains.

21. The method of claim 20, wherein the plurality of roles comprise one or more of:
  a domain role defining user rights within a single domain; and
  a universal role defining user rights across a plurality of domains.

22. The method of claim 20, wherein a first domain and a second domain are joined by a unidirectional trust relationship, allowing privileges associated with the first domain's assets to be delegated to the second domain.

23. The method of claim 20, wherein a first domain and a second domain are joined by a bidirectional trust relationship, allowing:
  privileges associated with the first domain's assets to be delegated to the second domain; and
  privileges associated with the second domain's assets to be delegated to the first domain.

24. The method of claim 20, wherein a first domain owns a second domain such that the first domain can create and destroy the second domain.

25. The method of claim 17, wherein the plurality of roles are assigned to a plurality of user groups, each user group comprising one or more of the plurality of members.

26. The method of claim 17, wherein each of the plurality of access control lists comprises a plurality of access control entries, each comprising:
  a domain identifier;
  a role identifier; and
  one or more privileges.

27. The method of claim 17, further comprising:
  providing at least two domains; and
  granting the particular member, which is assigned a particular domain/role combination, ownership of a particular operation on a particular access control list, ownership over of the particular access control list allowing the particular member to grant rights to perform the operation to one or more members in a different domain than the particular member that are assigned the same role as the particular member.

28. The method of claim 17, wherein:
  one or more of the plurality of assets each comprise a registered asset, a registered asset being a resource for which secure access is provided; and
  each registered asset is classified according to a corresponding asset type, which determines how its corresponding registered assets are identified and what operations may be performed on its corresponding registered assets.

29. The method of claim 17, further comprising authorizing access to the requested asset by:
  receiving from the particular member a request to access the requested asset, the request comprising:
    an identification of the requested asset;
    an identification of an operation to perform with respect to the requested asset; and
    an identification of the domain and role assigned to the particular member;
  determining, based at least in part on the access control list corresponding to the requested asset and the domain and role assigned to the particular member, whether the particular member may perform the identified operation with respect to the requested asset; and
  initiating an appropriate action based on the authorization determination.

30. The method of claim 17, further comprising:
  receiving from the particular member a request comprising:
    one or more query criteria specifying one or more assets; and
    an identification of the domain and role assigned to the particular member;
  adding appropriate security-related criteria to the request;
  executing a query to determine one or more assets satisfying the query criteria to which the particular member has read access; and
  initiating an appropriate action based on results of the executed query.

31. The method of claim 17, further comprising:
  receiving a request to define a new asset type, the request comprising one or more of a name of the new asset type, a description of the new asset type; and a format of the new asset type;
  enabling determination of one or more operations that should apply to the new asset type; and
  enabling association of the determined one or more operations with the new asset type.

32. Software for providing secure access to a plurality of assets within a computer system, the software embodied in computer-readable media and when executed using one or more computer systems operable to:
  register a plurality of members to use the computer system;
  establishing a plurality of groups, each group comprising at least two of the plurality of members;
  provide a plurality of roles defining user rights to access one or more of the plurality of assets, each member and each group associated with at least one role;
  provide a plurality of access control lists each corresponding to an asset and defining at least one privilege for accessing the asset corresponding to the privilege, according to a member's role;

provide at least one domain defining an administrative and access control boundary around a plurality of security entities, the security entities of the at least one domain comprising:
  a subset of the plurality of assets and the access control lists corresponding to the assets in the subset of the assets;
  a subset of the plurality of roles; and
  a subset of the members;
each privilege defined in the access control lists of the at least one domain identifying one or more roles in the domain that may access the asset corresponding to the privilege;
when a particular member attempts to access a requested asset within the at least one domain, determine at least one role assigned to the particular member;
compare rights corresponding to the role assigned to the particular member to the privileges defined in the access control list corresponding to the particular asset; and
if the attempted access is authorized for the role assigned to the particular member, allow the particular member to access the requested asset.

33. The software of claim 32, wherein a requested access is one from the types read, modify, or delete.

34. The software of claim 32, further operable to, prior to the particular member attempting to access the requested asset:
  authenticate the particular member's identification; and
  assign at least one role to the particular member.

35. The software of claim 32, operable to provide at least two domains.

36. The software of claim 35, wherein the plurality of roles comprise one or more of:
  a domain role defining user rights within a single domain; and
  a universal role defining user rights across a plurality of domains.

37. The software of claim 35, wherein a first domain and a second domain are joined by a unidirectional trust relationship, allowing privileges associated with the first domain's assets to be delegated to the second domain.

38. The software of claim 35, wherein a first domain and a second domain are joined by a bidirectional trust relationship, allowing:
  privileges associated with the first domain's assets to be delegated to the second domain; and
  privileges associated with the second domain's assets to be delegated to the first domain.

39. The software of claim 35, wherein a first domain owns a second domain such that the first domain can create and destroy the second domain.

40. The software of claim 32, wherein the plurality of roles are assigned to a plurality of user groups, each user group comprising one or more of the plurality of members.

41. The software of claim 32, wherein each of the plurality of access control lists comprises a plurality of access control entries, each comprising:
  a domain identifier;
  a role identifier; and
  one or more privileges.

42. The software of claim 32, further operable to:
provide at least two domains; and
grant the particular member, which is assigned a particular domain/role combination, ownership of a particular operation on a particular access control list, ownership over of the particular access control list allowing the particular member to grant rights to perform the operation to one or more members in a different domain than the particular member that are assigned the same role as the particular member.

43. The software of claim 32, wherein:
one or more of the plurality of assets each comprise a registered asset, a registered asset being a resource for which secure access is provided; and
each registered asset is classified according to a corresponding asset type, which determines how its corresponding registered assets are identified and what operations may be performed on its corresponding registered assets.

44. The software of claim 32, further operable to authorize access to the requested asset by:
  receiving from the particular member a request to access the requested asset, the request comprising:
    an identification of the requested asset;
    an identification of an operation to perform with respect to the requested asset; and
    an identification of the domain and role assigned to the particular member;
  determining, based at least in part on the access control list corresponding to the requested asset and the domain and role assigned to the particular member, whether the particular member may perform the identified operation with respect to the requested asset; and
  initiating an appropriate action based on the authorization determination.

45. The software of claim 32, further operable to:
receive from the particular member a request comprising:
  one or more query criteria specifying one or more assets; and
  an identification of the domain and role assigned to the particular member;
add appropriate security-related criteria to the request;
  execute a query to determine one or more assets satisfying the query criteria to which the particular member has read access; and
  initiate an appropriate action based on results of the executed query.

46. The software of claim 32, further operable to:
receive a request to define a new asset type, the request comprising one or more of a name of the new asset type, a description of the new asset type; and a format of the new asset type;
enable determination of one or more operations that should apply to the new asset type; and
enable association of the determined one or more operations with the new asset type.

* * * * *